(12) United States Patent
Toyota (10) Patent No.: US 10,392,054 B2
(45) Date of Patent: Aug. 27, 2019

(54) JOINING STRUCTURE AND JOINING METHOD FOR VEHICLE

(71) Applicant: TOYOTA JIDOSHA KABUSHIKI KAISHA, Toyota-shi, Aichi-ken (JP)

(72) Inventor: Masaru Toyota, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 65 days.

(21) Appl. No.: 15/855,311

(22) Filed: Dec. 27, 2017

(65) Prior Publication Data
US 2018/0237078 A1 Aug. 23, 2018

(30) Foreign Application Priority Data
Feb. 21, 2017 (JP) ................. 2017-030292

(51) Int. Cl.
*B60N 3/00* (2006.01)
*B62D 27/02* (2006.01)
*B62D 65/02* (2006.01)
*C09J 201/00* (2006.01)
*C09J 5/00* (2006.01)
*C09J 5/06* (2006.01)

(52) U.S. Cl.
CPC .......... *B62D 27/026* (2013.01); *B62D 65/02* (2013.01); *C09J 5/00* (2013.01); *C09J 5/06* (2013.01); *C09J 201/00* (2013.01); *C09J 2201/61* (2013.01); *C09J 2400/163* (2013.01); *C09J 2400/22* (2013.01); *C09J 2400/226* (2013.01)

(58) Field of Classification Search
CPC ............... E04B 2/78; E04B 2002/7483; E04B 2002/7487; H01L 2924/0002; H04R 1/021; B65D 2519/00019; B65D 2519/00273; G02F 1/133615; G02B 6/0085; G02B 6/009
USPC ........................................ 296/24.44
See application file for complete search history.

(56) References Cited

U.S. PATENT DOCUMENTS

| | | | |
|---|---|---|---|
| 4,791,765 A | 12/1988 | Noggle | |
| 5,076,631 A * | 12/1991 | Lord, Jr. ................. | B60R 13/02 296/37.8 |
| 5,171,054 A * | 12/1992 | Wilson ................ | B60R 11/0217 296/193.04 |
| 5,498,050 A * | 3/1996 | Maruyama .............. | B60R 5/044 296/37.16 |
| 5,813,715 A * | 9/1998 | Musukula ............ | B60N 2/0224 296/63 |

(Continued)

FOREIGN PATENT DOCUMENTS

| | | |
|---|---|---|
| JP | H05-332570 A | 12/1993 |
| JP | H07-042780 A | 2/1995 |

(Continued)

*Primary Examiner* — Kiran B Patel
(74) *Attorney, Agent, or Firm* — Oliff PLC (57) ABSTRACT

A joining structure for a vehicle includes: a panel formed of resin; a temporary holding member, formed of metal, formed in a hat shape in cross-section, and having a top wall and a pair of flange portions, the pair of flange portions being fastened to the panel; a reinforcing member, formed of metal, welded to the top wall, and being disposed so as to face the panel; and a thermosetting adhesive, provided between the panel and the reinforcing member, and joining the panel and the reinforcing member.

6 Claims, 7 Drawing Sheets

(56) References Cited

U.S. PATENT DOCUMENTS

| | | | | |
|---|---|---|---|---|
| 6,863,333 | B2* | 3/2005 | Heller | B60J 7/0084 |
| | | | | 296/107.09 |
| 7,328,928 | B2* | 2/2008 | Aizawa | B62D 25/087 |
| | | | | 296/24.4 |
| 8,287,022 | B2* | 10/2012 | Decorme | B60R 5/044 |
| | | | | 296/24.43 |
| 8,511,731 | B2* | 8/2013 | Sakai | B62D 25/087 |
| | | | | 296/193.02 |
| 8,544,929 | B2* | 10/2013 | Brown | B60N 2/22 |
| | | | | 296/24.44 |
| 8,827,342 | B2* | 9/2014 | Kuroda | B60R 5/044 |
| | | | | 296/37.16 |
| 9,216,633 | B2* | 12/2015 | Payne | B62D 25/12 |
| 2003/0025045 | A1* | 2/2003 | Hinokio | H04R 1/023 |
| | | | | 248/27.1 |
| 2004/0090086 | A1* | 5/2004 | Broadhead | B60R 5/044 |
| | | | | 296/193.01 |
| 2007/0075568 | A1* | 4/2007 | Kim | B60R 11/0217 |
| | | | | 296/193.08 |
| 2016/0318556 | A1 | 11/2016 | Ikeda et al. | |
| 2017/0210208 | A1* | 7/2017 | Zhang | B60J 3/02 |
| 2018/0099698 | A1* | 4/2018 | Toyota | B62D 21/157 |

FOREIGN PATENT DOCUMENTS

| | | |
|---|---|---|
| JP | H08-276865 A | 10/1996 |
| JP | 2015-124797 A | 7/2015 |

* cited by examiner

FIG.5

JOINING STRUCTURE AND JOINING METHOD FOR VEHICLE

CROSS-REFERENCE TO RELATED APPLICATION

This application claims priority under 35 USC 119 from Japanese Patent Application No. 2017-030292 filed on Feb. 21, 2017, the disclosure of which is incorporated by reference herein.

BACKGROUND

Technical Field

The present invention relates to a joining structure and a joining method for a vehicle.

Related Art

Conventionally, structures in which, in a vehicle, an upper back panel that is formed of metal and an upper back reinforcement that is formed of metal are joined by welding are known (see, for example, Japanese Patent Application Laid-Open (JP-A) No. H8-276865). The upper back reinforcement is a member that can be seen from the exterior, and is also a member to which weather stripping is attached. Further, conventionally, forming the members that structure the vehicle of resin in order to lighten the weight of the vehicle also is known.

However, in a case in which the upper back reinforcement is formed of resin, the appearance suffers, and there is the concern that poor sealing by the weather stripping may arise. Accordingly, in order to lighten the weight of the vehicle, it has been thought to form the upper back panel of resin, e.g., a carbon fiber reinforced resin (CFRP). However, an adhesive, such as a thermosetting adhesive or the like for example, is needed in order to join the upper back panel that is formed of resin and the upper back reinforcement that is formed of metal.

However, in a case in which the upper back panel and the upper back reinforcement are joined by a thermosetting adhesive, when the upper back panel and the upper back reinforcement are heated in order to cure the thermosetting adhesive, there is the concern that, at the time of cooling after the end of this heating, strain (deformation due to thermal strain) will arise at the upper back panel and the upper back reinforcement due to the difference in the linear expansions thereof. The following may occur in a case in which strain arises at the upper back panel and the upper back reinforcement.

Namely, in a case in which the upper back panel and the upper back reinforcement deform due to thermal strain, and become convex toward the vehicle body lower side, the amount of sealing by the weather stripping may become insufficient, and there is the concern that rain water and the like may leak into the trunk room. Further, in the case in which the upper back panel and the upper back reinforcement deform convex toward the vehicle body upper side, the amount of sealing by the weather stripping becomes excessive, and therefore, the reaction force of the weather stripping at the time of closing the back door increases, and there is the concern that it will be difficult to close the back door.

SUMMARY

The present disclosure a joining structure and a joining method for a vehicle that may suppress generation of strain at a panel that is formed of resin and a reinforcing member that is formed of metal even if the both are joined by a thermosetting adhesive.

A first aspect of the present disclosure is a joining structure for a vehicle, including: a panel formed of resin; a temporary holding member, formed of metal, formed in a hat shape in cross-section, and having a top wall and a pair of flange portions, the pair of flange portions being fastened to the panel; a reinforcing member, formed of metal, welded to the top wall, and being disposed so as to face the panel; and a thermosetting adhesive, provided between the panel and the reinforcing member, and joining the panel and the reinforcing member.

In accordance with the first aspect, the pair of flange portions of the temporary holding member, which is formed in a hat shape in cross-section, is fastened to the panel that is formed of resin, and the top wall of the temporary holding member is welded to the reinforcing member that is formed of metal. Accordingly, even if the panel and the reinforcing member are heated in order to cure the thermosetting adhesive that is provided between the panel and the reinforcing member, elongation of the reinforcing member may be suppressed by the panel via the temporary holding member. Namely, in the first aspect, even though the panel and the reinforcing member are joined by the thermosetting adhesive, the generation of strain at the both may be suppressed.

In a second aspect of the present disclosure, in the first aspect, through-holes for fastening may be respectively formed in the pair of flange portions, and a through-hole of one of the pair of flange portions may be formed as a long hole that runs along a length direction of the temporary holding member.

In accordance with the second aspect, the through-hole of one of the flange portions of the temporary holding member is made to be a long hole that runs along the length direction of the temporary holding member. Accordingly, even if the positions of the through-holes formed in the flange portions are offset in the length direction of the temporary holding member with respect to the through-holes for fastening that are formed in the panel, the temporary holding member may be fastened to the panel. Namely, in accordance with the second aspect, dispersion (errors) in the positions of the through-holes formed in the panel and the through-hole formed in the temporary holding member may be absorbed by the long hole.

In a third aspect of the present disclosure, in the second aspect, the pair of flange portions may be fastened to the panel by rivets; and inner diameters of through-holes for fastening that are formed in the panel and the through-hole of another of the pair of flange portions may respectively have the same outer diameter as body portions of the rivets.

In accordance with the third aspect, the pair of flange portions are fastened to the panel by rivets. The inner diameters of the through-holes for fastening that are formed in the panel and the through-hole of the other flange portion are respectively formed to be the same as the outer diameter of the body portions of the rivets. Accordingly, the panel and the temporary holding member moving with respect to the rivets may be suppressed. Due thereto, in accordance with the third aspect, elongation of the reinforcing member may be suppressed more effectively by the panel via the temporary holding member.

In a fourth aspect of the present disclosure, in any one of the first through third aspects, a cut-out portion or a hole portion may be formed at the panel, in a region that faces the top wall.

In accordance with the fourth aspect, a cut-out portion or a hole portion is formed in the region of the panel which region faces the top wall. Accordingly, in accordance with the fourth aspect, a welding gun for welding the top wall and the reinforcing member may be inserted easily.

In a fifth aspect of the present disclosure, in any one of the first through fourth aspects, the panel may be an upper back panel that is provided at a vehicle rear portion side; and the reinforcing member may be an upper back reinforcement.

In accordance with the fifth aspect, although it is easy for water droplets of rainwater or the like, which flow down from the back door or the rear glass, to collect at the upper back reinforcement, the upper back reinforcement and the temporary holding member are joined by welding. Therefore, in accordance with the fifth aspect, as compared with a case in which these are joined by mechanical fastening by bolts or rivets or the like, the occurrence of leakage of water into the vehicle interior through the through-holes for fastening may be suppressed.

A sixth aspect of the present disclosure is a joining method for a vehicle, including: fastening a pair of flange portions of a temporary holding member to a panel formed of resin, the temporary holding member being formed of metal and being formed in a hat shape in cross-section, and having a top wall and the pair of flange portions; coating a thermosetting adhesive on the panel; placing a reinforcing member, formed of metal, in contact with the thermosetting adhesive and a top surface of the top wall; and welding the top wall and the reinforcing member together.

In accordance with the sixth aspect, since the reinforcing member is temporarily held at the panel during the time until the thermosetting adhesive cures, the reinforcing member becoming offset from or separating from the panel may be suppressed.

BRIEF DESCRIPTION OF THE DRAWINGS

Exemplary embodiments will be described in detail based on the following figures, wherein.

DETAILED DESCRIPTION

An exemplary embodiment relating to the present disclosure is described in detail hereinafter on the basis of the drawings. Note that, for convenience of explanation, arrow UP that is shown appropriately in the respective drawings is the vehicle body upward direction, arrow FR is the vehicle body forward direction, and arrow RH is the vehicle body rightward direction. Further, in the following description, when the vertical, longitudinal, and left-right directions are used without being specified, they refer to the vertical of the vehicle body vertical direction, the longitudinal of the vehicle body longitudinal direction and the left and right of the vehicle body left-right direction (the vehicle transverse direction).

Figure 1:
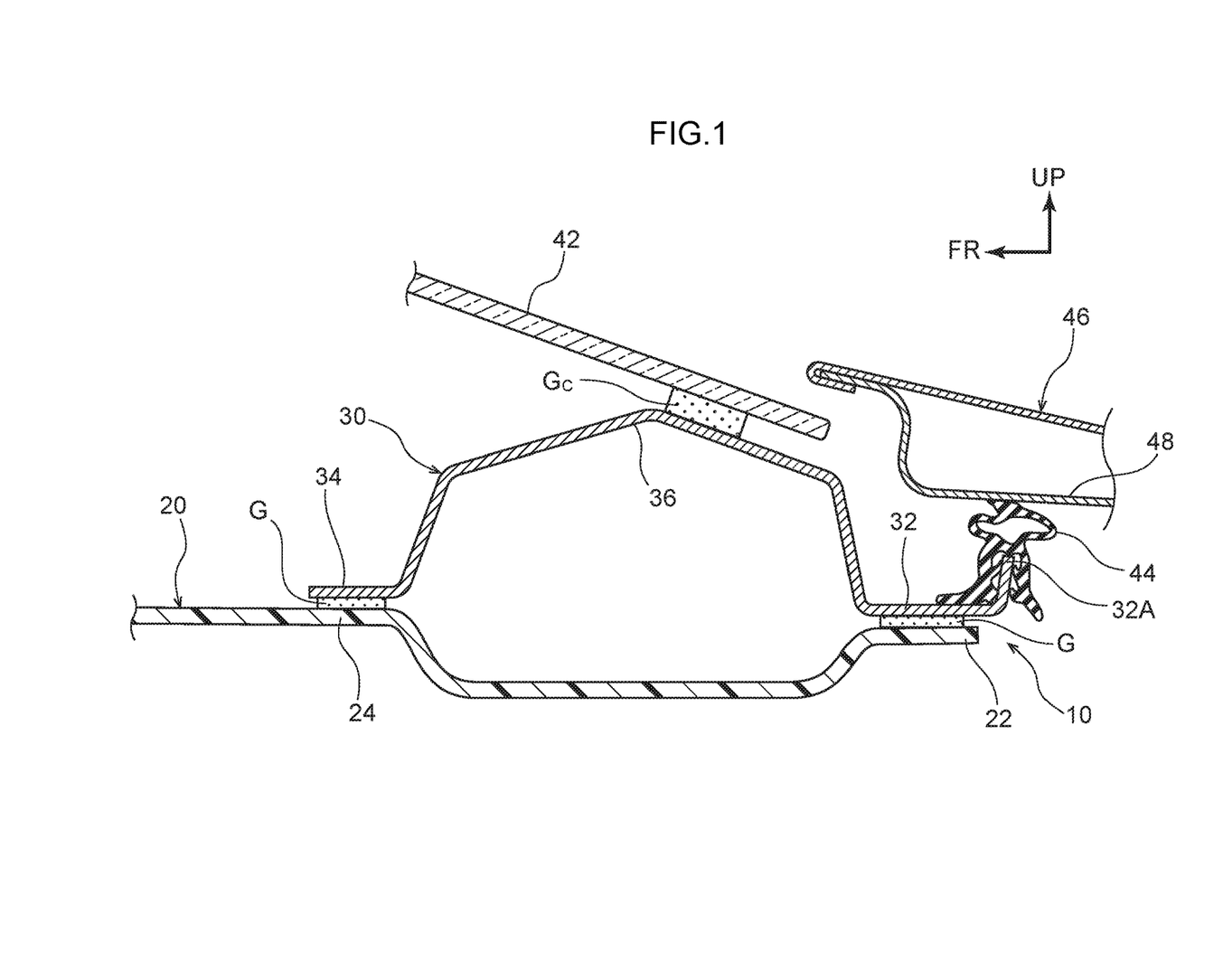
FIG. 1 is a cross-sectional view showing the rear portion side of a vehicle, to which a joining structure relating to a present exemplary embodiment is applied, as seen from a vehicle transverse direction.

Further, as shown in FIG. 1, description is given by using, as an example, a case in which a joining structure 10 for a vehicle relating to the present exemplary embodiment is applied to an upper back panel 20 that serves as an example of a panel that is formed of resin, and an upper back reinforcement (hereinafter simply called "reinforcement") 30 that serves as an example of a reinforcing member that is formed of metal. Moreover, in the present exemplary embodiment, as an example, the upper back panel 20 is formed of a carbon fiber reinforced resin (CRFP), and the reinforcement 30 is formed of iron.

As shown in FIG. 1, the rear portion of the upper back panel 20 is formed in a substantial hat shape in cross-section that is convex toward the vehicle body lower side, as seen in a cross-section viewed from the vehicle transverse direction. Note that, in the following description, the rear side portion that is the rear portion of the upper back panel 20 and that forms the substantial hat shape as seen in cross-section (the rear end portion of the upper back panel 20) is explained as a rear flange portion 22, and the front side portion (a region on which a thermosetting adhesive G that is described later is coated, refer to FIG. 4) is explained as a joining portion 24.

The reinforcement 30, which is formed in a substantial hat shape in cross-section that is convex toward the vehicle body upper side as seen in a cross-section viewed from the vehicle transverse direction, is disposed at the rear portion of the upper back panel 20 so as to face the rear portion of the upper back panel 20 in the vehicle body vertical direction, and is joined thereto by the thermosetting adhesive G. Namely, a rear flange portion 32 that is the rear end portion of the reinforcement 30 is joined from the upper side to the rear flange portion 22 of the upper back panel 20, and a front flange portion 34 that is the front end portion of the reinforcement 30 is joined from the upper side to the joining portion 24 of the upper back panel 20.

Due thereto, at the rear portion of the upper back panel 20, a substantially rectangular closed cross-sectional shape that extends in the vehicle transverse direction is formed by the upper back panel 20 and the reinforcement 30. The joining structure 10 for a vehicle and the joining method, which relate to the present exemplary embodiment and are for forming this substantially rectangular closed cross-sectional shape, are described in detail later.

An upper wall 36 of the reinforcement 30 is bent slightly so as to be convex toward the vehicle body upper side. The lower end portion of a rear glass 42 is joined by a room temperature curing adhesive Gc to the rear end portion of this upper wall 36. Further, a rear end portion 32A at the rear flange portion 32 of the reinforcement 30 is bent toward the vehicle body upper side. The groove portion of a weather stripping 44 is fit-on this rear end portion 32A. Due thereto, the weather stripping is attached to the rear flange portion 32.

Note that the rear flange portion 32 of the reinforcement 30 is a portion that can be seen from the exterior, and is also a portion that functions as a gutter. Moreover, a back door 46, whose inner panel 48 is pushed-against the weather stripping 44 when an unillustrated trunk room is closed, is provided at the vehicle body rear side of the rear glass 42 and the upper wall 36 of the reinforcement 30.

The joining structure 10 for a vehicle relating to the present exemplary embodiment is described next.

Figure 2:
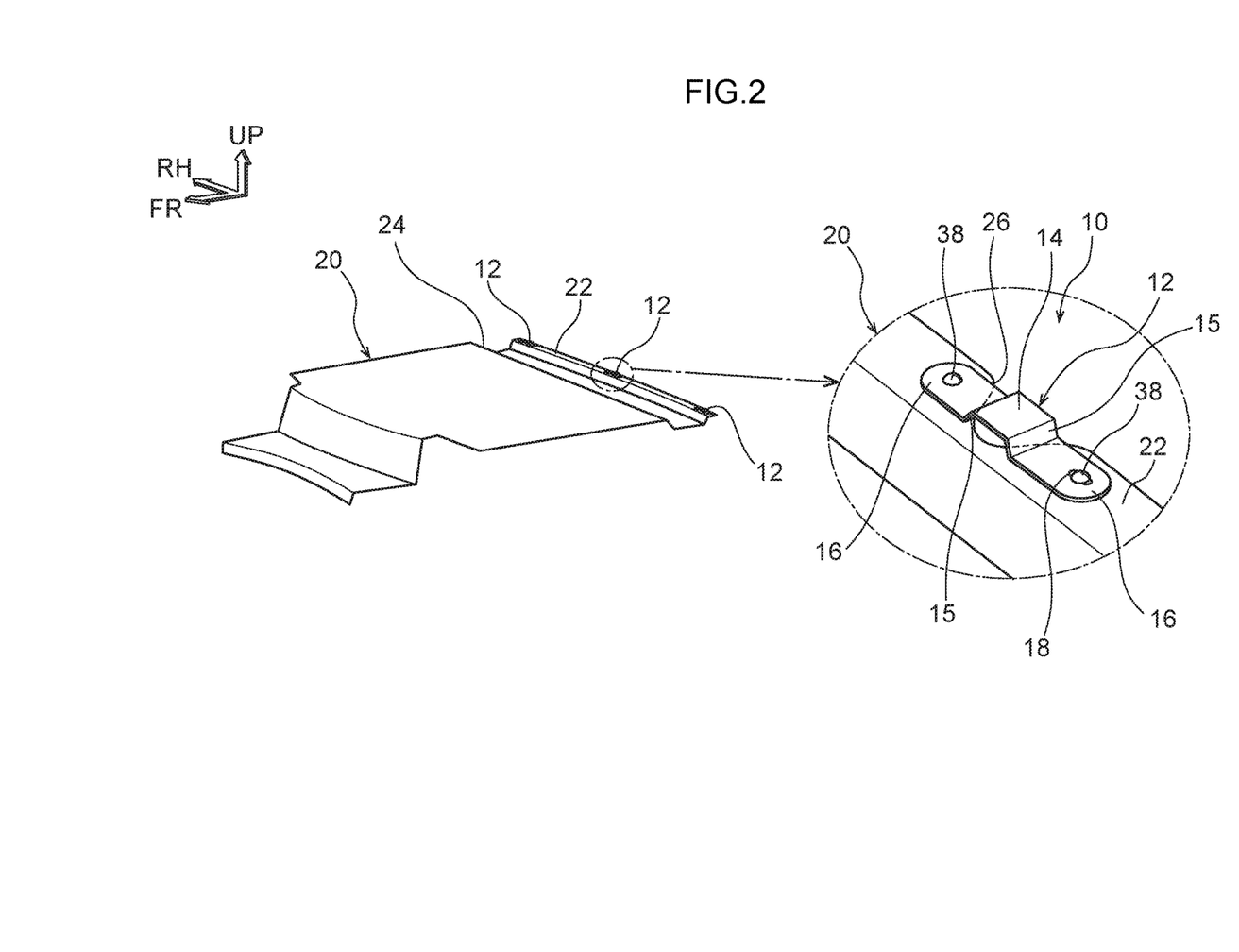
FIG. 2 is a perspective view showing the rear portion side of an upper back panel that structures the joining structure relating to the present exemplary embodiment.
Figure 3:
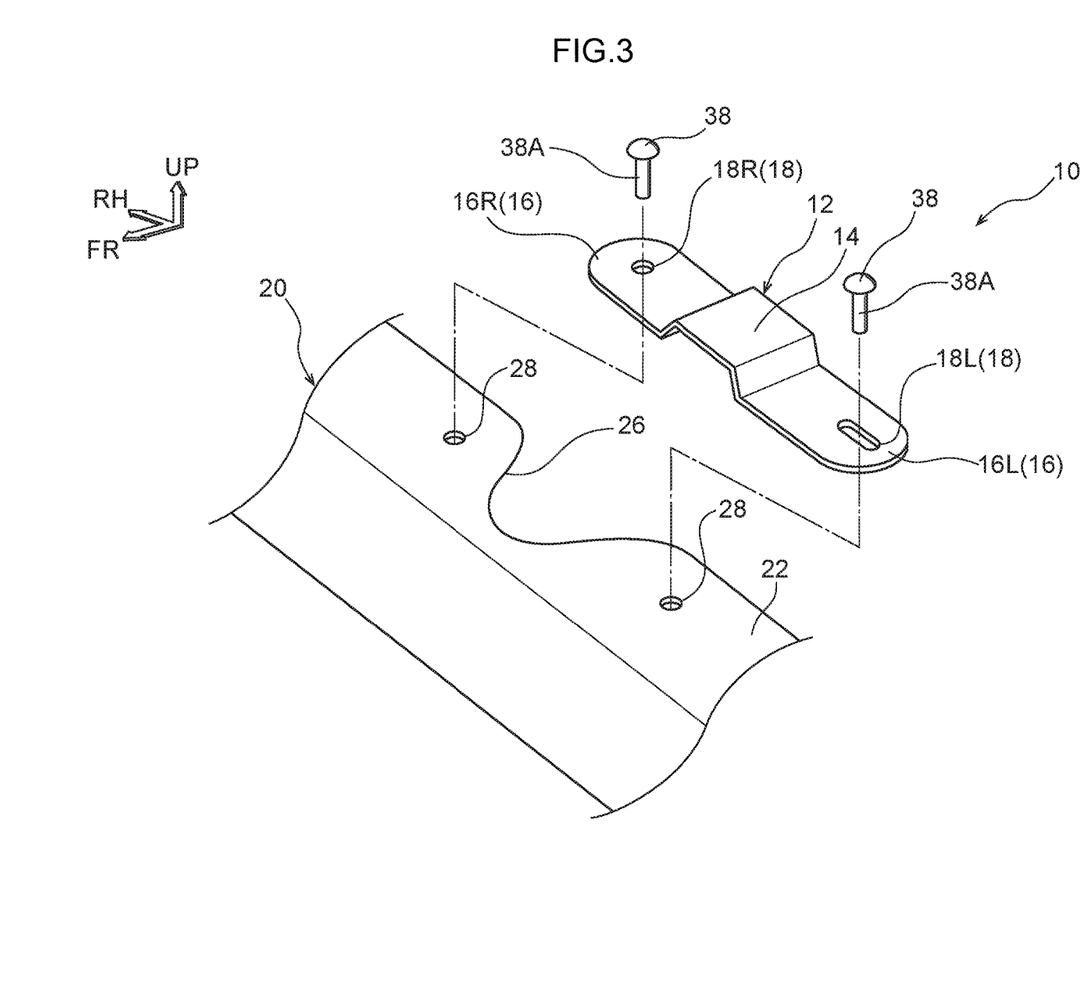
FIG. 3 is a perspective view showing a method of fastening a temporarily holding member to the upper back panel that structures the joining structure relating to the present exemplary embodiment.

As shown in FIG. 2 and FIG. 3, temporary holding members 12 that are formed of metal (e.g., that are formed of iron) are fastened and fixed by rivets 38 to the vehicle transverse direction (left and right) both end portions and the central portion (a total of three places) at the rear flange portion 22 of the upper back panel 20. In further detail, the length direction of the temporary holding member 12 is the vehicle transverse direction, and the temporary holding member 12 is formed substantially in the shape of a hat in cross-section that is convex toward the vehicle body upper side, as seen in a cross-section viewed from the vehicle body longitudinal direction.

Namely, the temporary holding member 12 has a top wall 14 that is shaped as a rectangular, flat plate as seen in a plan view, and a pair of flange portions 16 that extend toward the left and right outer sides from the top wall 14 via connecting portions 15. The pair of left and right flange portions 16 also are formed in the shapes of substantially rectangular, flat plates whose respective distal end portions are arc-shaped as seen in a plan view. Further, through-holes 18 for fastening, which are for fastening by the rivets 38, are formed in the pair of left and right flange portions 16 respectively.

Further, through-holes 28, which are circular and are for fastening and correspond to the respective through-holes 18 of the temporary holding members 12, are formed respectively in the vehicle transverse direction both end portions and central portion of the rear flange portion 22 of the upper back panel 20. A through-hole 18L of one (e.g., the left side) flange portion 16L is formed in the shape of a long hole (a substantially oval shape) that runs along the length direction of the temporary holding member 12 (the vehicle transverse direction).

Moreover, the inner diameters of the respective through-holes 28 that are formed in the rear flange portion 22 of the upper back panel 20, and the inner diameter of a through-hole 18R that is circular and is formed in another (e.g., the right side) flange portion 16R of the temporary holding member 12, are formed to be the same as the outer diameter of body portions 38A, which are solid cylindrical, of the respective rivets 38.

Figure 4:
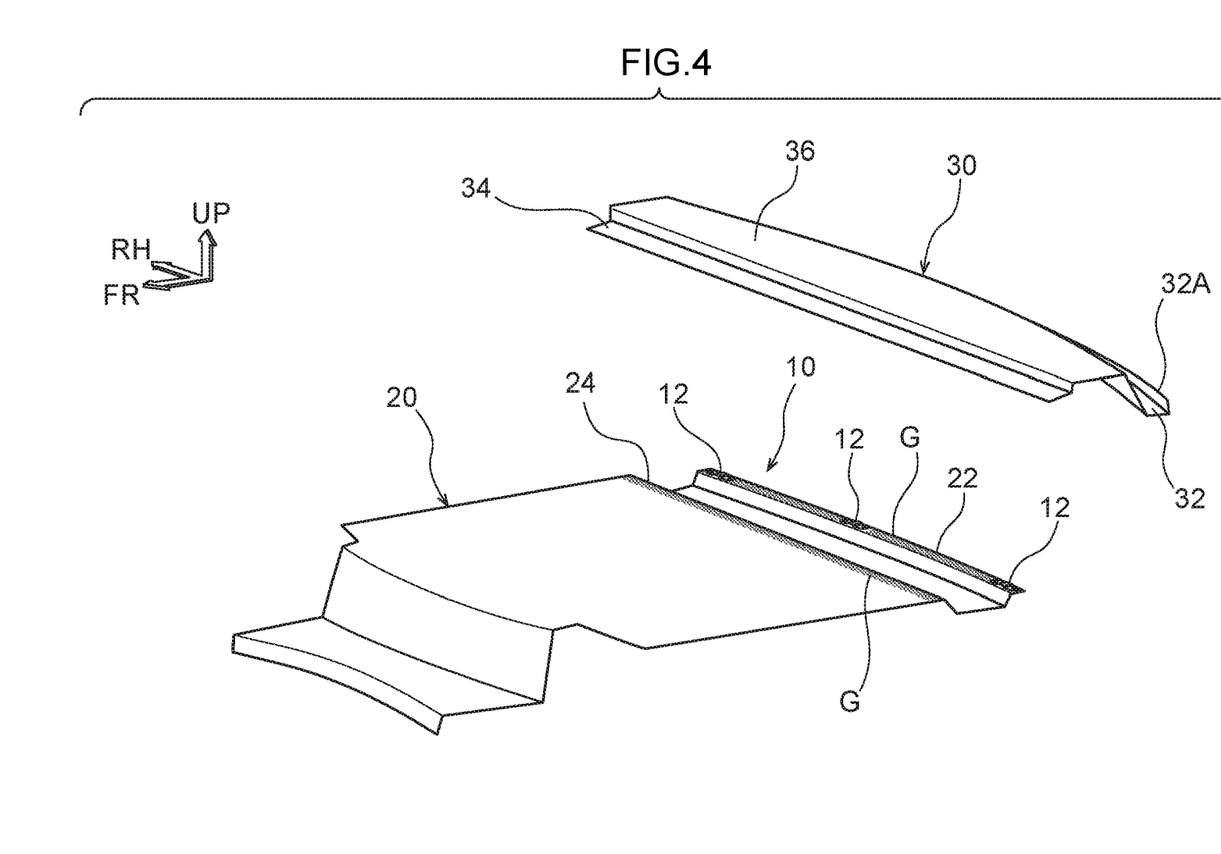
FIG. 4 is a perspective view showing a state in which an upper back reinforcement is joined to the upper back panel that structures the joining structure relating to the present exemplary embodiment.

As shown in FIG. 4, the thermosetting adhesive G is coated on the rear flange portion 22 of the upper back panel 20 at the regions other than the temporary holding members 12, and on the joining portion 24 of the upper back panel 20. Further, the rear flange portion 32 of the reinforcement 30 is disposed in a state of contacting the thermosetting adhesive which is on the rear flange portion 22, and the top surfaces of the top walls 14 of the temporary holding members 12 (refer to (1) of FIG. 7). The front flange portion 34 of the reinforcement 30 is disposed in a state of contacting the top surface of the thermosetting adhesive G that is on the joining portion 24.

Namely, the thermosetting adhesive G is provided respectively between the rear flange portion 22 of the upper back panel 20 and the rear flange portion 32 of the reinforcement 30, and between the joining portion 24 of the upper back panel 20 and the front flange portion 34 of the reinforcement 30. The thermosetting adhesive G joins these together. Further, the rear flange portion 32 of the reinforcement 30 is joined and fixed to the top walls 14 of the temporary holding members 12 by spot welding (refer to (2) of FIG. 7).

Due thereto, there is a structure in which the reinforcement 30 is restrained (temporarily held) by the upper back panel 20 via the temporary holding members 12 such that the reinforcement 30 does not move with respect to (does not become offset from, does not separate from) the upper back panel 20 until the thermosetting adhesive G is cured (concretely, during the time until the end of the drying step that dries, by heat within a drying furnace, the paint applied to the entire vehicle).

As shown in FIG. 2 and FIG. 3, cut-out portions 26, which are substantially "U" shaped in plan view and that open toward the vehicle body rear side, are formed in the rear flange portion 22 of the upper back panel 20 at regions facing the top walls 14 of the temporary holding members 12 in the vehicle body vertical direction. Due thereto, when seen in a bottom view, the bottom surfaces of the top walls 14 of the temporary holding members 12 are exposed from the rear flange portion 22.

The operation (joining method) of the joining structure 10 for a vehicle relating to the present exemplary embodiment having a structure as described above will be described on the basis of FIG. 6 and FIG. 7.

Figure 6:
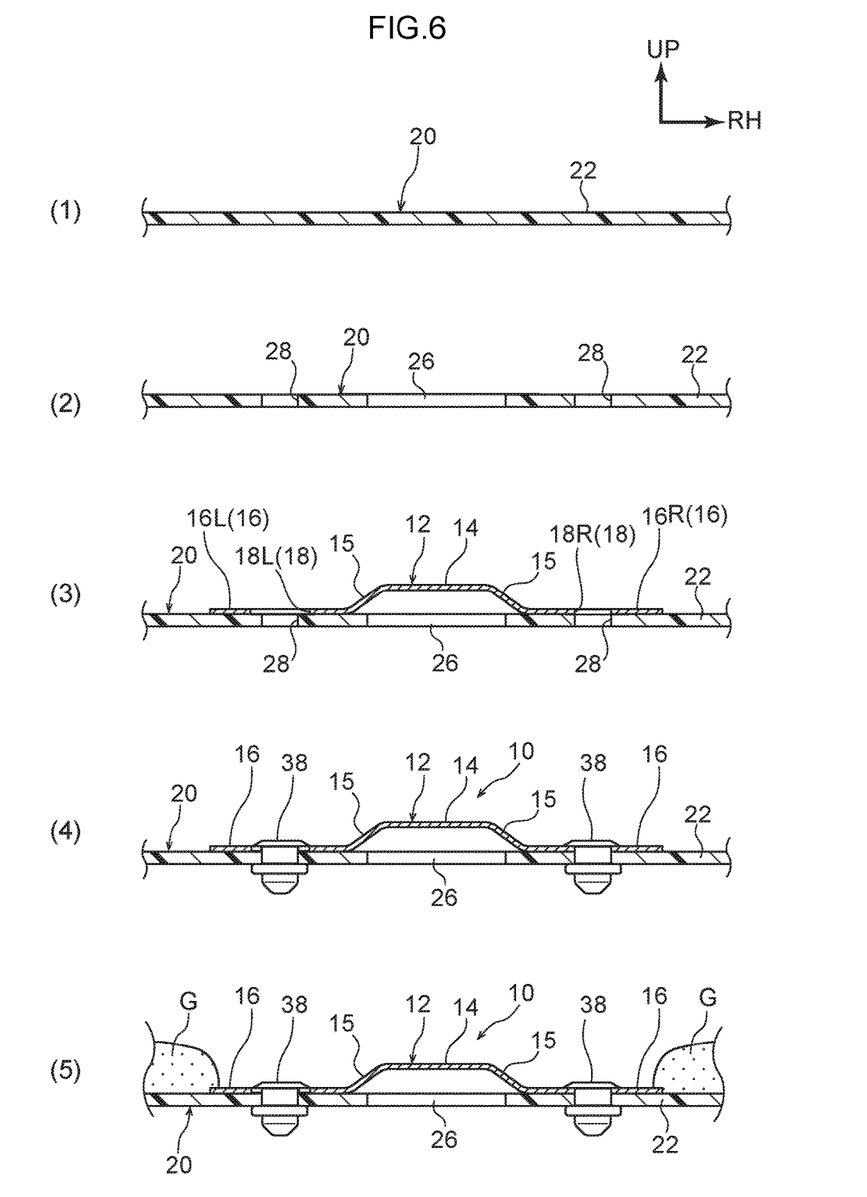
FIG. 6 is process drawing showing, in cross-section, steps up to the step of fixing the temporary holding member to the upper back panel that structures the joining structure relating to the present exemplary embodiment, and coating a thermosetting adhesive.

As shown in (1) and (2) of FIG. 6, first, the cut-out portions 26 and the through-holes 28 are formed in the rear flange portion 22 of the upper back panel 20. Then, as shown in (3) of FIG. 6, the temporary holding members 12 are placed on the rear flange portion 22, and the respective through-holes 18 that are formed in the flange portions 16 of the temporary holding members 12, and the respective through-holes 28 that are formed in the rear flange portion 22, are made to communicate with one another.

Next, as shown in (4) of FIG. 6, the body portions 38A of the rivets 38 are inserted-through the respective through-holes 18 and the respective through-holes 28, and are caulked, and the temporary holding members 12 are fastened and fixed on the rear flange portion 22 (fastening step). After the temporary holding members 12 are fastened and fixed on the rear flange portion 22, as shown in (5) of FIG. 6, the thermosetting adhesive G is coated on the rear flange portion 22 at the regions other than the temporary holding members 12.

Note that, at this time, the thermosetting adhesive G is coated so as to be slightly higher than the top walls 14 of the temporary holding members 12. Further, the thermosetting adhesive G may be coated slightly on the distal end portions of the flange portions 16 of the temporary holding members 12. Further, as shown in FIG. 4, the thermosetting adhesive G is coated also on the joining portion 24 of the upper back panel 20 to which the front flange portion 34 of the reinforcement 30 is joined (coating step).

Figure 7:
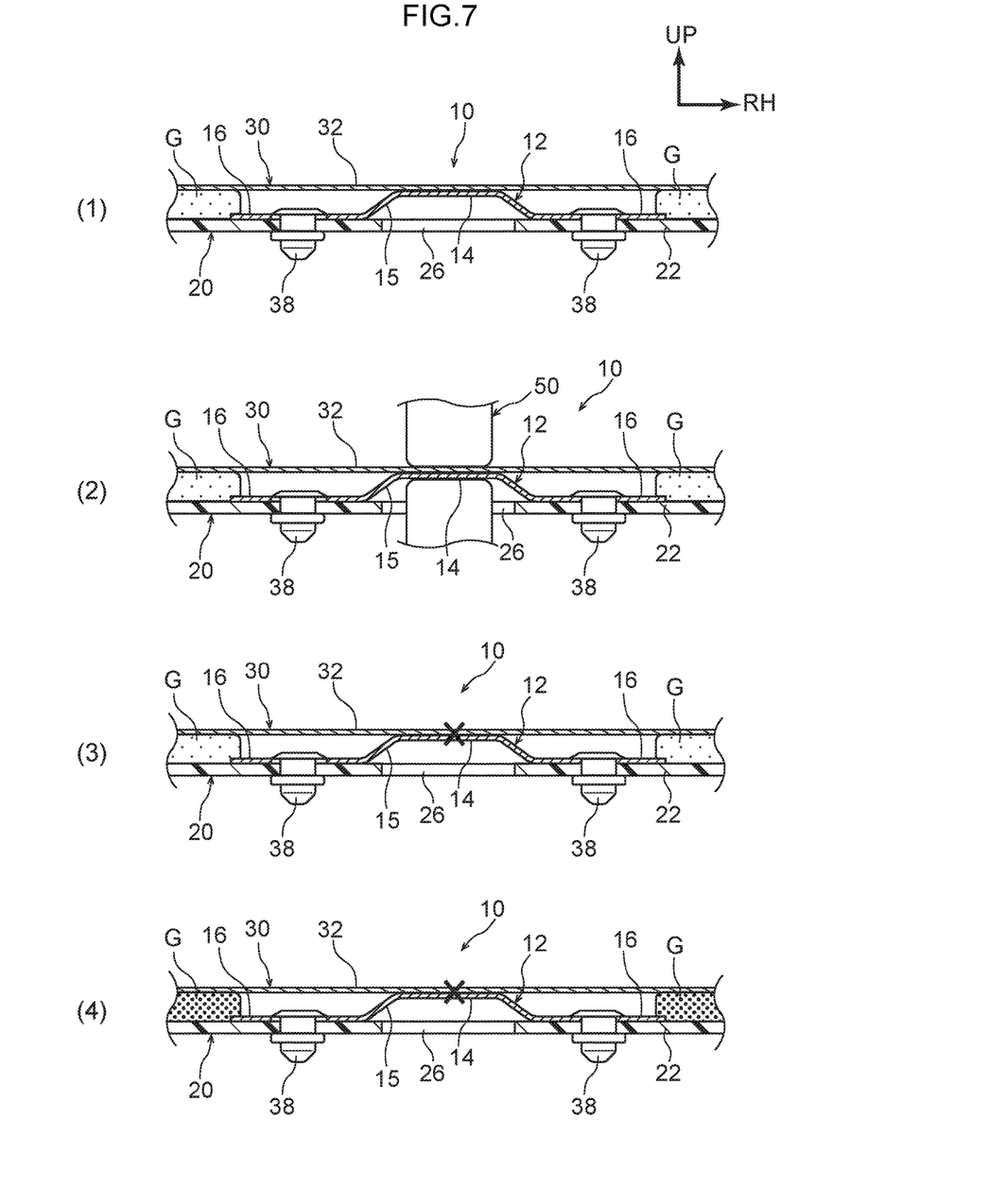
FIG. 7 is process drawing showing, in cross-section, steps up to the step of welding the upper back reinforcement to the temporary holding member that structures the joining structure relating to the present exemplary embodiment, and curing the thermosetting adhesive.

After coating of the thermosetting adhesive G on the rear flange portion 22 and on the joining portion 24 is ended, as shown in (1) of FIG. 7, the rear flange portion 32 of the reinforcement 30 is placed in a state of contacting the thermosetting adhesive G that is on the rear flange portion 22 and the top surfaces of the top walls 14 of the temporary holding members 12. Then, the front flange portion 34 of the reinforcement 30 is placed in a state of contacting the top surface of the thermosetting adhesive G that is on the joining portion 24 (placement step).

Thereafter, as shown in (2) of FIG. 7, the rear flange portion 32 of the reinforcement 30 and the top walls 14 of the temporary holding members 12 are spot welded by a welding gun 50 (welding step). Here, the cut-out portions 26 that open toward the vehicle body rear side are formed in regions of the upper back panel 20 that face the top walls 14, and the bottom surfaces of the top walls 14 are exposed from the rear flange portion 22 as seen in a bottom view.

Accordingly, at the time of spot welding the rear flange portion 32 of the reinforcement 30 to the top walls 14 of the temporary holding members 12, the welding gun 50 for this spot welding can be easily inserted. The rear flange portion 32 of the reinforcement 30 is joined and fixed by spot welding to the temporary holding members 12 that are fastened and fixed to the rear flange portion 22 of the upper back panel 20.

Namely, the reinforcement 30 is restrained (temporary held) at the upper back panel 20 via the temporary holding members 12. Accordingly, during the time until the thermosetting adhesive G is thermally cured (during the time until the end of the drying step that dries the paint, which has been applied to the entire vehicle, by the heat within a drying furnace), the reinforcement 30 becoming offset from or separating from (moving with respect to) the upper back panel 20 may be suppressed or prevented.

Figure 5:
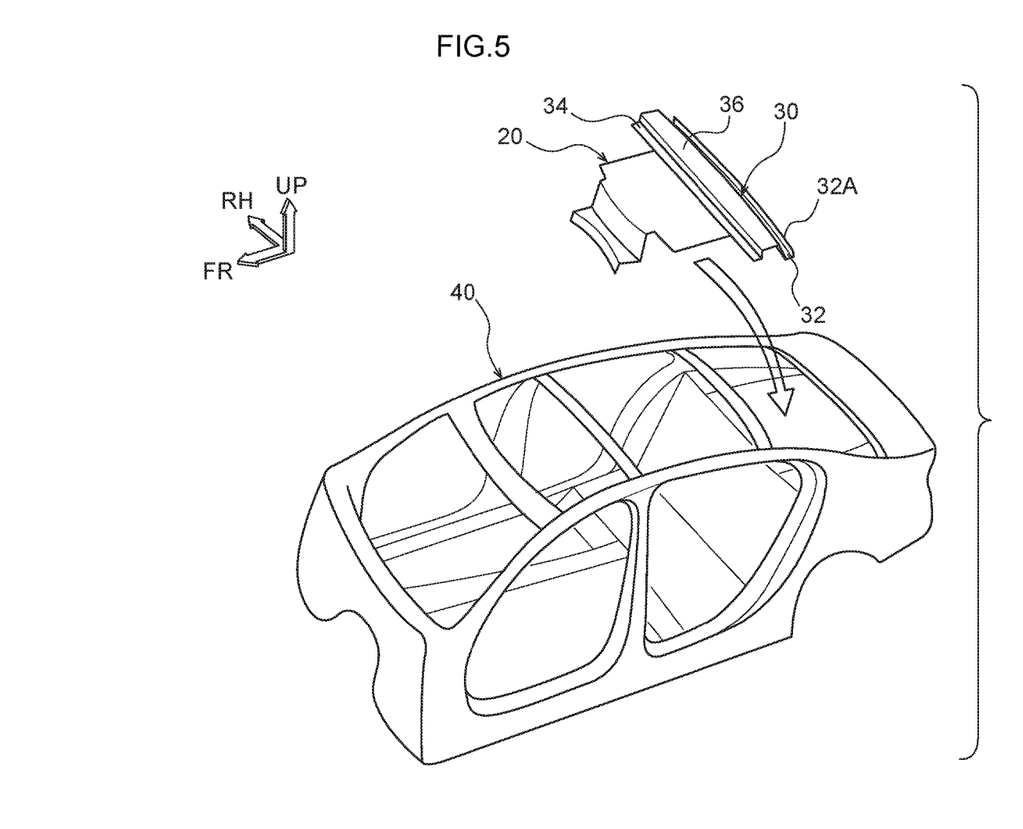
FIG. 5 is a perspective view showing a state in which the upper back panel, to which is joined the upper back reinforcement that structures the joining structure relating to the present exemplary embodiment, is mounted to a vehicle body.

As shown in (3) of FIG. 7, the rear flange portion 32 of the reinforcement 30 and the top walls 14 of the temporary holding members 12 are joined and fixed by spot welding (shown by the "x"), and thereafter, as shown in FIG. 5, the upper back panel 20 that temporarily holds the reinforcement 30 is provided at the rear portion side of a vehicle body 40. Then, after various types of other respective steps are carried out and the painting step that paints the entire vehicle is finished, in the drying step that dries the paint, the thermosetting adhesive G is heated together with the upper back panel 20 (the temporary holding members 12) and the reinforcement 30.

Here, moving (becoming offset from, separating from) of the reinforcement 30 with respect to the upper back panel 20 may be suppressed or prevented by the temporary holding members 12. In other words, the reinforcement 30 and the upper back panel 20 are, via the temporary holding members 12, restrained so as to not move with respect to one another (so as to not become offset from one another or separate from one another).

Accordingly, even if the upper back panel 20 (the temporary holding members 12) and the reinforcement 30 are heated together in order to cure the thermosetting adhesive G that is provided between the upper back panel 20 and the reinforcement 30, elongation of the reinforcement 30 may be suppressed or prevented by the upper back panel 20 via the temporary holding members 12.

Namely, the reinforcement 30 is restrained at the upper back panel 20 by the temporary holding members 12. Therefore, at the time of heating in order to join the upper back panel 20 and the reinforcement 30 by the thermosetting adhesive and at the time of cooling thereafter to an ordinary temperature, the both can be elongated and contracted equally. Accordingly, generation of strain (deformation due to thermal strain) at the upper back panel 20 and the reinforcement 30 may be suppressed or prevented.

Due to the thermosetting adhesive G being heated in this way, as shown in (4) of FIG. 7, the thermosetting adhesive G is cured. Due thereto, the rear flange portion 32 of the reinforcement 30 is joined and fixed by the thermosetting adhesive G to the rear flange portion 22 of the upper back panel 20, and the front flange portion 34 of the reinforcement 30 is joined and fixed by the thermosetting adhesive G to the joining portion 24 of the upper back panel 20.

Note that, in accordance with the present exemplary embodiment, while the various types of other steps are being carried out, the reinforcement 30 can be temporarily held (restrained) at the upper back panel 20 by the temporary holding members 12. Therefore, there is no need to provide, separately from the drying step, a step that is only for thermally curing the thermosetting adhesive G Accordingly, a reduction in cost in the manufacturing steps of the vehicle may be devised.

Further, it is easy for water droplets of rain water and the like, which have flowed down from the rear glass 42 or the back door 46, to collect at the rear flange portion 32 of the reinforcement 30. However, this rear flange portion 32 is joined by spot welding to the top walls 14 of the temporary holding members 12. Accordingly, as compared with a case in which these are joined by mechanical fastening by bolts or rivets or the like, the occurrence of leakage of water through the through-holes for fastening and into the vehicle interior may be suppressed or prevented.

The through-holes 18L at the flange portions 16L that are at the one sides (the left sides) of the temporary holding members 12 are made to be long holes that run along the length direction of the temporary holding members 12 (the vehicle transverse direction). Accordingly, the temporary holding members 12 can be fastened to the rear flange portion 22 even if the central positions of the through-holes 18L of these flange portions 16L are slightly offset in the length direction of the temporary holding members 12 (the vehicle transverse direction) with respect to the through-holes 28 for fastening that are formed in the rear flange portion 22 of the upper back panel 20.

Namely, dispersion (errors) in the positions of the through-holes 28, which are formed in the rear flange portion 22 of the upper back panel 20, and the respective through-holes 18L, 18R, which are formed in the respective flange portions 16L, 16R of the temporary holding members 12, can be absorbed by the through-holes 18L that are formed in the shapes of long holes that run along the length direction of the temporary holding members 12 (the vehicle transverse direction).

Further, the inner diameter of the through-holes 18R at the flange portions 16R at the other sides (the right sides) of the temporary holding members 12, and the inner diameter of the respective through-holes 28 at the rear flange portion 22 of the upper back panel 20, are respectively formed to be the same as the outer diameter of the body portions 38A of the rivets 38. Accordingly, the temporary holding members 12 and the upper back panel 20 moving with respect to the rivets 38 may also be suppressed or prevented.

Namely, at the time of heating in the drying step, the temporarily holding members 12 elongating in the vehicle transverse direction also can be suppressed or prevented more effectively by the upper back panel 20. Accordingly, elongation of the reinforcement 30 may be suppressed or prevented more effectively by the upper back panel 20 via the temporary holding members 12.

The joining structure 10 for a vehicle and joining method relating to the present exemplary embodiment have been described above on the basis of the drawings. However, the joining structure 10 for a vehicle and joining method relating to the present exemplary embodiment are not limited to the illustrated structure and method, and the designs thereof can be changed appropriately within a scope that does not depart from the gist of the present disclosure. For example, in order to easily insert the welding gun 50, hole portions (not illustrated) that pass-through, and not the cut-out portions 26, may be formed in the rear flange portion 22 of the upper back panel 20. Further, it may suffice to not form the cut-out portions 26 or hole portions, depending on the type of the welding gun 50.

Further, in a case in which there is no dispersion (error) between the positions of the respective through-holes 28 at the rear flange portion 22 of the upper back panel 20 and the respective through-holes 18 at the respective flange portions 16 of the temporary holding members 12, the through-holes 18L of the one flange portions 16L do not have to be formed in the shapes of long holes. Further, although the temporary holding members 12 are fastened and fixed by the rivets 38 to the rear flange portion 22 of the upper back panel 20, the fasteners and fixing parts are not limited to the rivets 38.

For example, the fasteners and fixing parts may be unillustrated bolts and nuts. However, the height (including the height of the top walls 14 of the temporary holding members 12) can be made to be shorter with the rivets 38 rather than with bolts and nuts, and therefore, the rivets 38 have the advantage that the amount of the thermosetting adhesive G that is coated (the cost required for the thermosetting adhesive G) can be reduced. Further, the rivets 38 have the advantage of lightening the weight of the vehicle, more so than bolts and nuts do.

Further, the temporary holding members 12 are provided at a total of three places which are the vehicle transverse direction (left and right) both end portions and central portion of the rear flange portion 22 of the upper back panel 20, i.e., three of the temporary holding members 12 are provided. However, the number of the temporary holding members 12 is not limited to the three that are illustrated. However, if more than three of the temporary holding members 12 are provided, the weight of the vehicle increases, and, therefore, it is desirable for there to be two to three of the temporary holding members 12 including at least at the vehicle transverse direction both end portions.

The joining structure 10 for a vehicle relating to the present exemplary embodiment is not limited to a form of being applied at the time of joining the reinforcement 30 to the upper back panel 20. Provided that a panel that is formed of resin and a reinforcing member that is formed of metal are joined by the thermosetting adhesive and that there is a region where it is easy for water droplets of rainwater or the like to collect, the joining structure 10 for a vehicle can also be applied to, for example, a reinforcement or a cowl or the like at the vehicle body rear side of an unillustrated roof.

Accordingly, the panel that is formed of resin relating to the present exemplary embodiment is not limited to the upper back panel 20, and the reinforcing member relating to the present exemplary embodiment also is not limited to the reinforcement 30. Further, the resin that structures the panel is not limited to a carbon fiber reinforced resin (CFRP), and the metal that structures the reinforcing member and the temporary holding members 12 is not limited to iron.

What is claimed is:

1. A joining structure for a vehicle, comprising:
   a panel formed of resin;
   a temporary holding member, formed of metal, formed in a hat shape in cross-section, and having a top wall and a pair of flange portions, the pair of flange portions being fastened to the panel;
   a reinforcing member, formed of metal, welded to the top wall, and being disposed so as to face the panel; and
   a thermosetting adhesive, provided between the panel and the reinforcing member, and joining the panel and the reinforcing member.

2. The joining structure for a vehicle of claim 1, wherein through-holes for fastening are respectively formed in the pair of flange portions, and
   a through-hole of one of the pair of flange portions is formed as a long hole that runs along a length direction of the temporary holding member.

3. The joining structure for a vehicle of claim 2, wherein:
   the pair of flange portions are fastened to the panel by rivets; and
   inner diameters of through-holes for fastening that are formed in the panel and the through-hole of another of the pair of flange portions respectively have the same outer diameter as body portions of the rivets.

4. The joining structure for a vehicle of claim 1, wherein a cut-out portion or a hole portion is formed at the panel, in a region that faces the top wall.

5. The joining structure for a vehicle of claim 1, wherein:
   the panel is an upper back panel that is provided at a vehicle rear portion side; and
   the reinforcing member is an upper back reinforcement.

6. A joining method for a vehicle, comprising:
   fastening a pair of flange portions of a temporary holding member to a panel formed of resin, the temporary holding member being formed of metal and being formed in a hat shape in cross-section, and having a top wall and the pair of flange portions;
   coating a thermosetting adhesive on the panel;
   placing a reinforcing member, formed of metal, in contact with the thermosetting adhesive and a top surface of the top wall; and
   welding the top wall and the reinforcing member together.

* * * * *